US010369734B2

(12) United States Patent
Oono

(10) Patent No.: US 10,369,734 B2
(45) Date of Patent: Aug. 6, 2019

(54) INJECTION MOLDING SYSTEM FOR PERFORMING ASSEMBLY OPERATION IN MOLD

(71) Applicant: FANUC CORPORATION, Yamanashi (JP)

(72) Inventor: Hajime Oono, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 202 days.

(21) Appl. No.: 15/485,666

(22) Filed: Apr. 12, 2017

(65) Prior Publication Data

US 2017/0297243 A1 Oct. 19, 2017

(30) Foreign Application Priority Data

Apr. 14, 2016 (JP) .................. 2016-080872

(51) Int. Cl.
B29C 45/76 (2006.01)
B29C 45/16 (2006.01)

(52) U.S. Cl.
CPC ........ B29C 45/7686 (2013.01); B29C 45/162 (2013.01); B29C 2945/7602 (2013.01);
(Continued)

(58) Field of Classification Search
CPC ............... B29C 45/162; B29C 45/006; B29C 2045/0063; B29C 45/7686;
(Continued)

(56) References Cited

U.S. PATENT DOCUMENTS 4,883,418 A * 11/1989 Hehl .................... B02C 18/148
425/217

FOREIGN PATENT DOCUMENTS

JP 61-046330 3/1986
JP 6-15682 3/1994
(Continued)

OTHER PUBLICATIONS

Partial machine translation of JP2004106272A dated Apr. 2004 obtained from the espace website. (Year: 2004).*
(Continued)

Primary Examiner — Robert B Davis
(74) Attorney, Agent, or Firm — Wenderoth, Lind & Ponack, L.L.P.

(57) ABSTRACT

An injection molding system includes: a first extruding member that extrudes a first molded article from a mold; a robot that transfers the first molded article extruded from the mold to an assembling position in relation to a second molded article in the mold; a second extruding member that extrudes the second molded article from the mold towards the first molded article retained at the assembling position by way of the robot, and assembles the second molded article to the first molded article; and a load detection unit that detects load applied to the second extruding member, in which defect discrimination of the first molded article, the second molded article, or an assembled state of the first molded article and the second molded article is performed, based on load detected by the load detection unit when the second molded article is assembled to the first molded article.

6 Claims, 7 Drawing Sheets

(52) U.S. Cl.
CPC ............... *B29C 2945/76033* (2013.01); *B29C 2945/76317* (2013.01); *B29C 2945/76421* (2013.01)

(58) Field of Classification Search
CPC .. B29C 2945/7602; B29C 2945/76033; B29C 2945/76317; B29C 2945/76421
See application file for complete search history.

(56) References Cited

FOREIGN PATENT DOCUMENTS

| | | | |
|---|---|---|---|
| JP | 07-237224 | 9/1995 | |
| JP | 09-011270 | 1/1997 | |
| JP | 2000-238090 | 9/2000 | |
| JP | 2001-030121 | 2/2001 | |
| JP | 2003191283 A * | 7/2003 | ........... B29C 45/006 |
| JP | 2004106272 A * | 4/2004 | ......... B29C 45/7626 |
| JP | 2004-306490 | 11/2004 | |
| JP | 2005-313277 | 11/2005 | |
| JP | 2011-173243 | 9/2011 | |

OTHER PUBLICATIONS

Notification of Reasons for Refusal dated Jun. 5, 2018 in Japanese Patent Application No. 2016-080872.
Notification of Reasons for Refusal dated Aug. 7, 2018 in Japanese Patent Application No. 2016-080872.

* cited by examiner

INJECTION MOLDING SYSTEM FOR PERFORMING ASSEMBLY OPERATION IN MOLD

This application is based on and claims the benefit of priority from Japanese Patent Application No. 2016-080872, filed on 14 Apr. 2016, the content of which is incorporated herein by reference.

BACKGROUND OF THE INVENTION

Field of the Invention

The present invention relates to an injection molding system for molding a plurality of types of molded articles.

Related Art

Conventionally, a technique has been known, in which a molded article molded in a mold is taken out by way of a robot, and is combined with another component. Documents disclosing this type of technique include Patent Documents 1 and 2. Patent Document 1 discloses a technique, in which a plurality of molded articles A and B are molded in the same mold; and after mold opening, one molded article A is taken out from the mold by way of a robot, and is aligned with another molded article B, thereby assembling the molded article A and the molded article B. Patent Document 2 discloses a technique, in which a preformed component (moveable pin) is aligned with a molded article after the mold opening, and the molded article is extruded by way of an ejector pin, thereby assembling the component to the molded article.

Patent Document 1: Japanese Unexamined Patent Application, Publication No. 2000-238090

Patent Document 2: Japanese Unexamined Patent Application, Publication No. H6-1568

SUMMARY OF THE INVENTION

Although the automated assembling of molded articles molded in a mold can improve the productivity, defective assembling may be caused due to inappropriate alignment in the automatic assembling by way of robots, etc. It is preferable that such defective assembling should be promptly detected, from a perspective of productivity. However, the techniques disclosed in Patent Documents 1 and 2 also perform assembly in a mold, still leaving room for improvement in terms of promptly and accurately detecting defective assembling.

An object of the present invention is to provide a configuration for an injection molding system that automatically assembles a molded article, in which an assembled state of the molded article is evaluated, and defective assembling is promptly detected, thereby improving the productivity.

(1) The present invention relates to an injection molding system, which includes: a mold (e.g. mold 11 to be described later) in which a first molded article (e.g. first molded article 21 to be described later) and a second molded article (e.g. second molded article 22 to be described later) can be simultaneously molded; a first extruding member (e.g. first extruding member 61 to be described later) that extrudes the first molded article from the mold; a molded-article transfer device (e.g. robot 14 to be described later) that transfers the first molded article extruded from the mold to an assembling position in relation to the second molded article in the mold; a second extruding member (e.g. second extruding member 62 to be described later) that extrudes the second molded article from the mold against the first molded article retained at the assembling position by way of the molded-article transfer device, and assembles the second molded article to the first molded article; and a load detection unit (e.g. load detection unit 110 to be described later) that detects load applied to at least one of the second extruding member and the molded-article transfer device, in which defect discrimination of the first molded article, the second molded article, or an assembled state of the first molded article and the second molded article is performed, based on load detected by way of the load detection unit when the second molded article is assembled to the first molded article.

(2) The injection molding system according to the first aspect may further include a base (e.g. base 60 to be described later) that supports the first extruding member and the second extruding member formed shorter than the first extruding member, in which the first extruding member and the second extruding member move integrally with the base; through a first extruding operation, the first molded article moves to a first extruding position where the first molded article is extruded from the mold by way of the first extruding member; and through a second extruding operation, the base progressively moves from the first extruding position to the assembling position where the second molded article is extruded from the mold by way of the second extruding member.

(3) In the injection molding system according to the first or second aspect, the load detection unit detects at least one of: load torque of a motor (e.g. servo motor 52 to be described later) for an extruding member that drives the second extruding member; a current value of the motor for the extruding member; an estimated disturbance value that is disturbance estimated of the motor for the extruding member; a detection value of a strain sensor (e.g. strain sensor 250 to be described later) provided to the second extruding member; load torque of a motor (e.g. servo motor 53 to be described later) for a transfer device that drives the molded-article transfer device; and a current value of the motor for the transfer device.

(4) In the injection molding system according to any one of the first to third aspects, the molded-article transfer device may be an articulated robot.

(5) The injection molding system according to any one of the first to fourth aspects may further include a warning device (e.g. alarm 150 to be described later) that is activated when abnormality is discriminated in the performance of defect discrimination.

(6) The injection molding system according to any one of the first to fifth aspects, when abnormality is discriminated in the performance of defect discrimination, the molded-article transfer device may transfer the first molded article, the second molded article, or an assembled article in which the first molded article is assembled to the second molded article, to a disposal position outside of the mold.

The present invention can provide a configuration for an injection molding system that automatically assembles a molded article, in which an assembled state of the molded article is evaluated, and defective assembling is promptly detected, thereby improving the productivity.

DETAILED DESCRIPTION OF THE INVENTION

Figure 1:
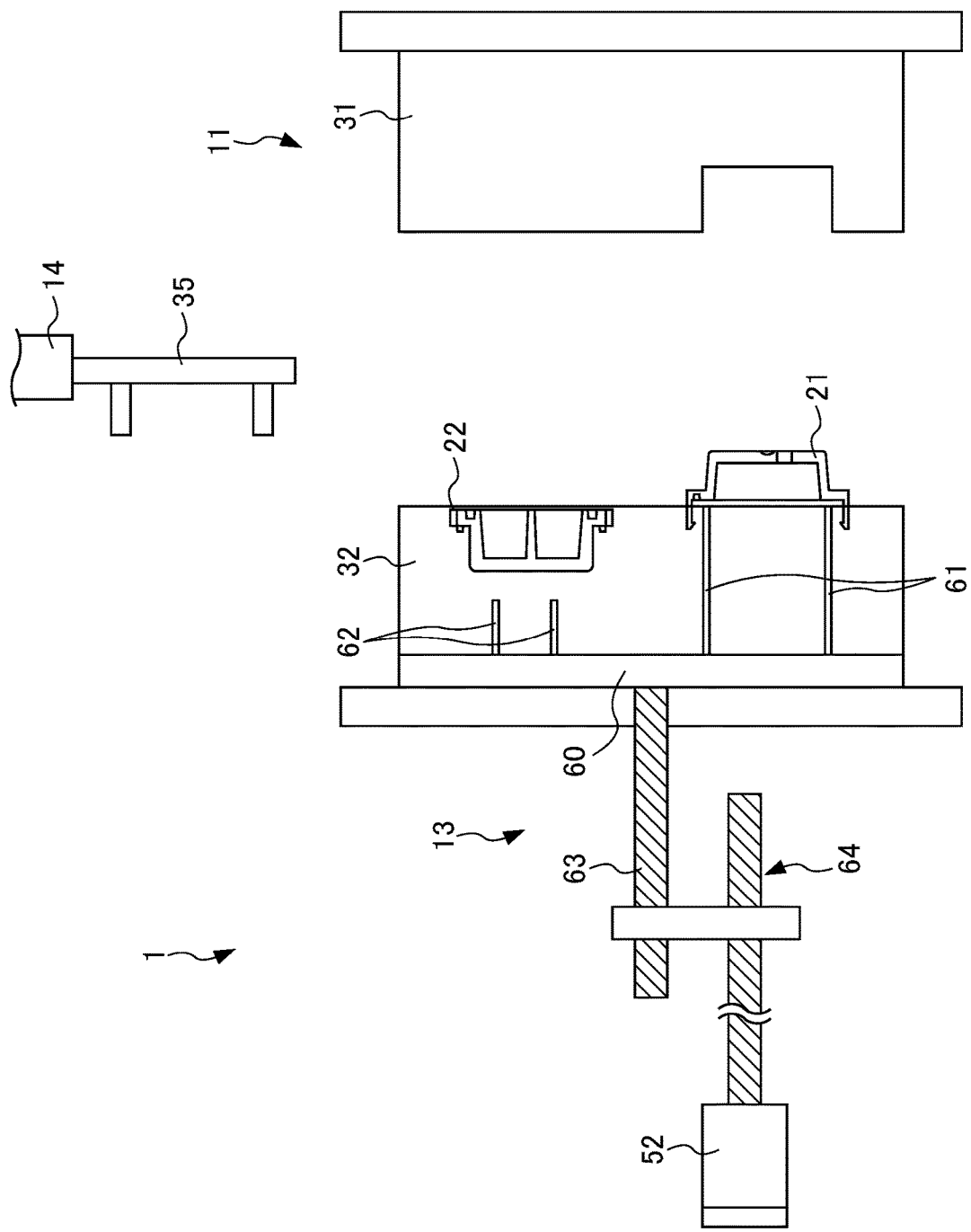
FIG. 1 is a schematic diagram illustrating essential part of an injection molding system 1 according to an embodiment of the present invention.
Figure 2:
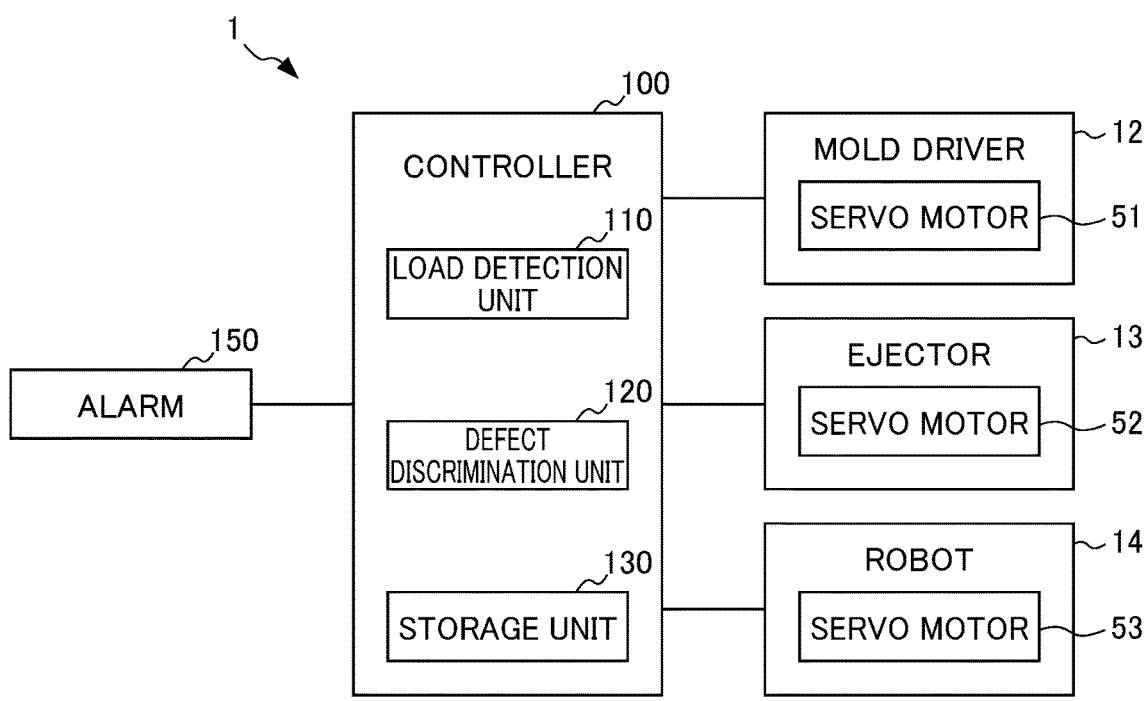
FIG. 2 is a block diagram of the injection molding system 1 of the present embodiment.

A preferred embodiment of the present invention is hereinafter described with reference to the drawings. FIG. 1 is schematic diagram illustrating essential part of an injection molding system 1 according to an embodiment of the present invention, in which a state after the mold opening is illustrated. FIG. 2 is a block diagram of the injection molding system 1 of the present embodiment.

As illustrated in FIG. 1, the injection molding system 1 of the present embodiment includes: a mold 11 in which a first molded article 21 and a second molded article 22 can be simultaneously molded; and a robot 14 that transfers the first molded article 21.

The mold 11 includes: a stationary mold 31, to which a portion for introducing molten resin (not illustrated) is connected; and a movable mold 32 that is movable in relation to the stationary mold 31. The stationary mold 31 and the movable mold 32 form a cavity for forming the first molded article 21 and a cavity for forming the second molded article 22. Note that a molding machine for use may be a single-material molding machine for molding with a single type of material, or a multi-material molding machine capable of simultaneously obtaining molded articles in different colors from different materials.

Mold clamping and mold opening of the mold 11 are performed by way of a mold driver 12 (not illustrated in FIG. 1). As illustrated in FIG. 2, the mold driver 12 includes a servomotor 51 controlled by a controller 100 to be described later, and transfers the movable mold 32 by way of drive control of the servomotor 51, between a mold clamping position where the movable mold 32 is aligned with the stationary mold 31, and a mold opening position where the movable mold 32 is separated from the stationary mold 31.

An appropriate scheme can be employed as a mechanism for transferring the movable mold 32. For example, it is possible to employ a structure, in which a stationary platen is coupled to a rear platen arranged behind a movable platen by way of a plurality of tie bars, such that the movable platen and the rear platen move along the tie bars; and the stationary mold 31 and the movable mold 32 are attached to the facing surfaces of the stationary platen and the movable platen, respectively.

Further, the movable mold 32 is arranged with an ejector 13 that separates the first molded article 21 and second molded article 22 from the mold 11. The ejector 13 has a function to separate the first molded article 21 molded in the mold 1 from the cavity of the movable mold 32, and separate the second molded article 22 from the cavity of the movable mold 32, at different times.

As illustrated in FIG. 1, the ejector 13 of the present embodiment includes: a base 60, to which a first extruding member 61 and a second extruding member 62 are attached; a connecting shaft 63 attached to the base 60; a ball screw mechanism 64 connected to the connecting shaft 63; and a servomotor 52 that drives the ball screw mechanism 64.

The base 60 is arranged such that the first extruding member 61 and the second extruding member 62 project from one side surface thereof in the same direction. The first extruding member 61 corresponds to a position of the cavity for molding the first molded article 21; and the second extruding member 62 corresponds to a position of the cavity for molding the second molded article 22. The first extruding member 61 is formed longer than the second extruding member 62.

The connecting shaft 63 is connected to the other side of the base 60, and the base 60 is connected to the ball screw mechanism 64 via the connecting shaft 63.

The ball screw mechanism 64 is driven by the servomotor 52, and transfers the base 60 via the connecting shaft 63. The first extruding member 61 and the second extruding member 62 move integrally with the base 60 and have a positional relationship, such that the first extruding member 61, which projects for a longer distance from the base 60, comes in contact with the first molded article 21, and the second extruding member 62, which projects for a shorter distance from the base 60, subsequently comes in contact with the second molded article 22.

The robot 14 is an articulated arm robot, and includes a retention mechanism 35 at the tip thereof. The retention mechanism 35 is an end effector for retaining the first molded article 21, and is composed of a grip hand that sandwiches and retains the first molded article 21, a sucker portion that sticks fast to and retains the first molded article 21, or the like.

As illustrated in FIG. 2, the robot 14 is controlled by the controller 100. The robot 14 includes a servomotor 53 as a drive unit; and the servomotor 53 performs positional control of the robot 14.

The controller 100 is electrically connected to each device such as the mold driver 12, the ejector 13 and the robot 14, and is a computer that controls these units.

A description is now made of the flow of an assembling operation of the first molded article 21 and the second molded article 22. At first, the mold 11 in the mold clamping state is filled with a material that is subsequently solidified to mold the first molded article 21 and the second molded article 22. After the first molded article 21 and the second molded article 22 are molded, the movable mold 32 reaches the mold opening state by way of the servomotor 51 of the mold driver (the state illustrated in FIG. 1).

Figure 3:
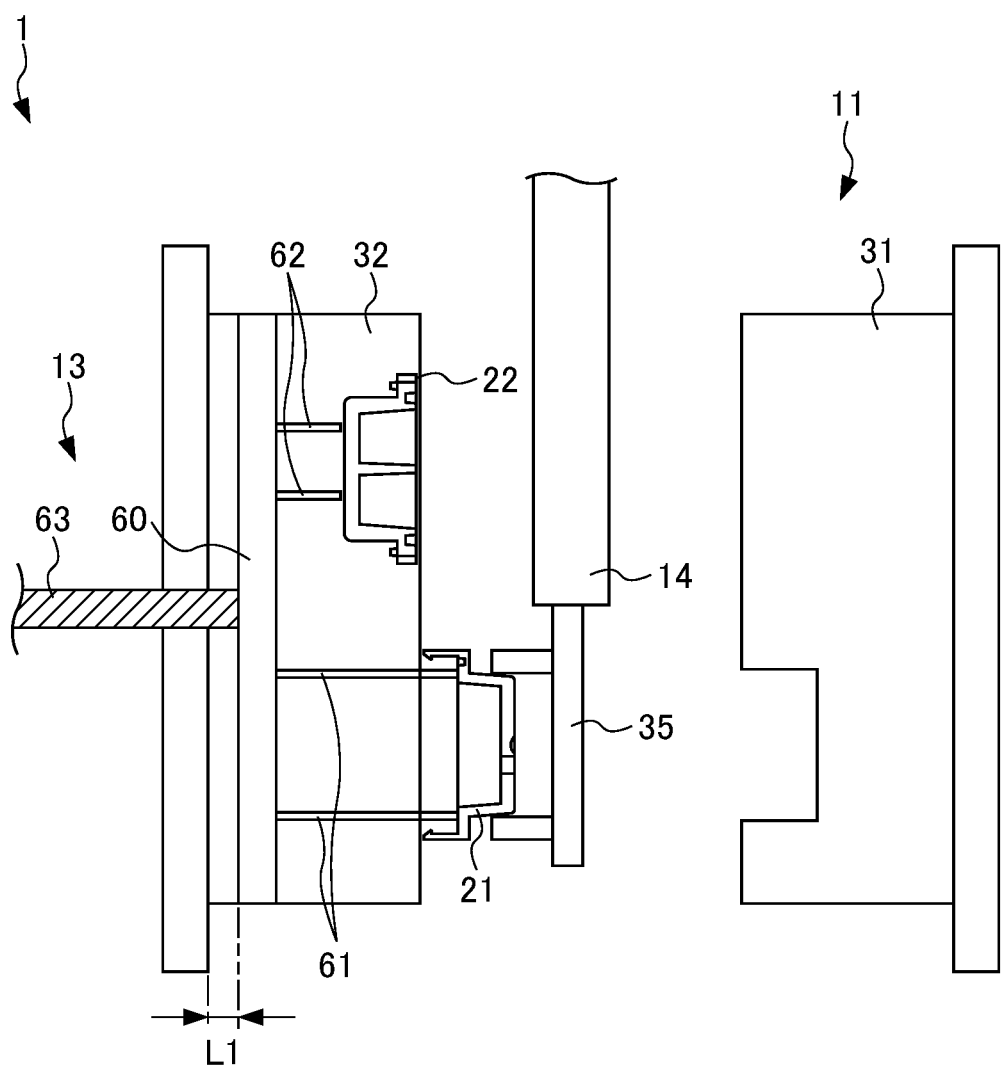
FIG. 3 is a diagram schematically illustrating a state in which a robot 14 grips a first molded article 21 at a first extruding position.

FIG. 3 is a diagram schematically illustrating a state in which the robot 14 grips the first molded article 21 at a first extruding position. As illustrated in FIG. 3, after the mold opening, the controller 100 drives the servomotor 52 of the ejector 13, transfers the base 60 by a distance L1, and positions the base 60 at the first extruding position. At the first extruding position, the first molded article 21 is in a state of being lifted from the cavity of the movable mold 32 by way of the first extruding member 61. In this state, the second extruding member 62 is not in contact with the second molded article 22. In addition, the robot 14 grips the first molded article 21 at the first extruding position.

Figure 4:
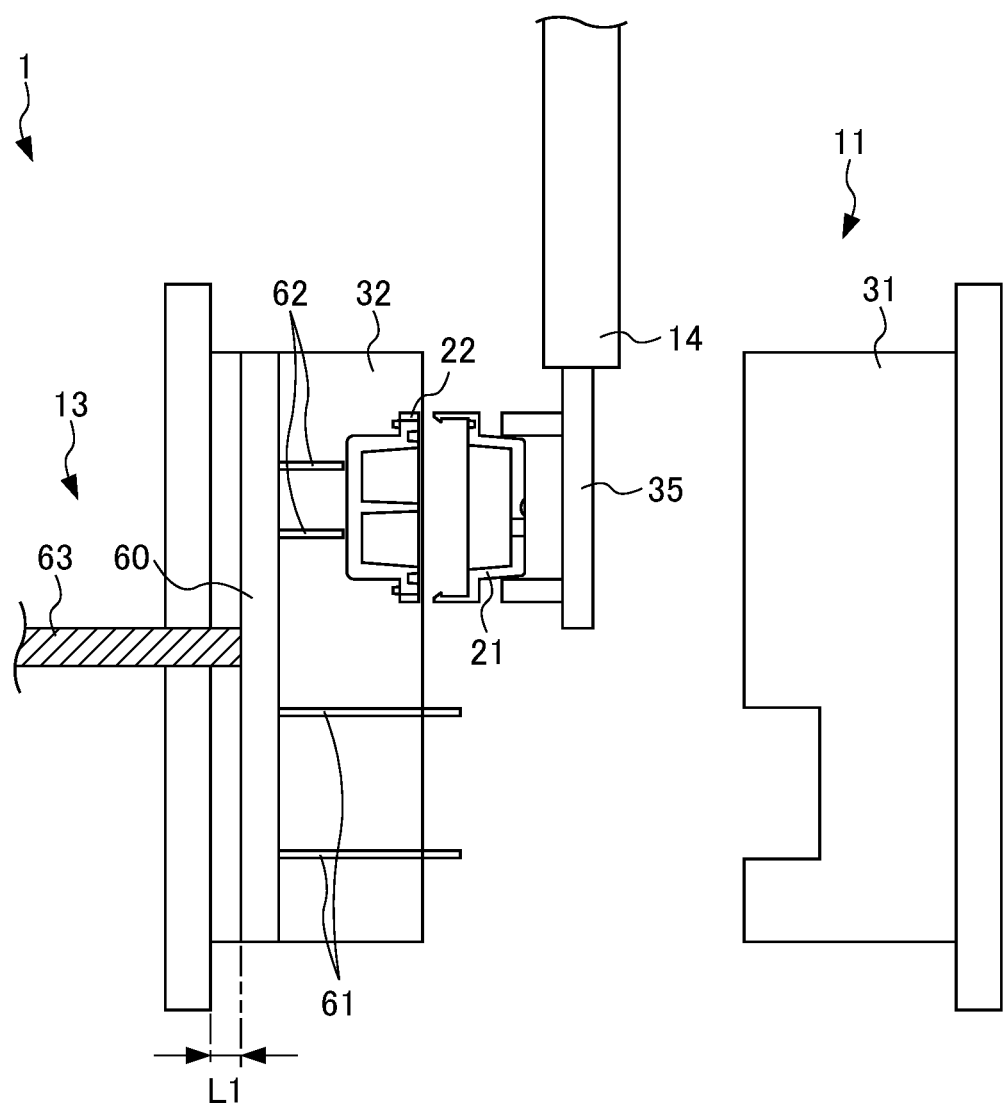
FIG. 4 is a diagram schematically illustrating a state in which the robot 14 retains the first molded article 21 at an assembling position.

FIG. 4 is a diagram schematically illustrating a state in which the robot 14 retains the first molded article 21 at an assembling position. As illustrated in FIG. 4, the controller 100 transfers the first molded article 21, which is gripped at the first extruding position, to an assembling position where the first molded article 21 is assembled to the second molded article 22. The assembling position of the present embodiment is inward of the mold 11 in the mold opening state, and is a position corresponding to the second molded article 22 in the cavity of the movable mold 32.

Figure 5:
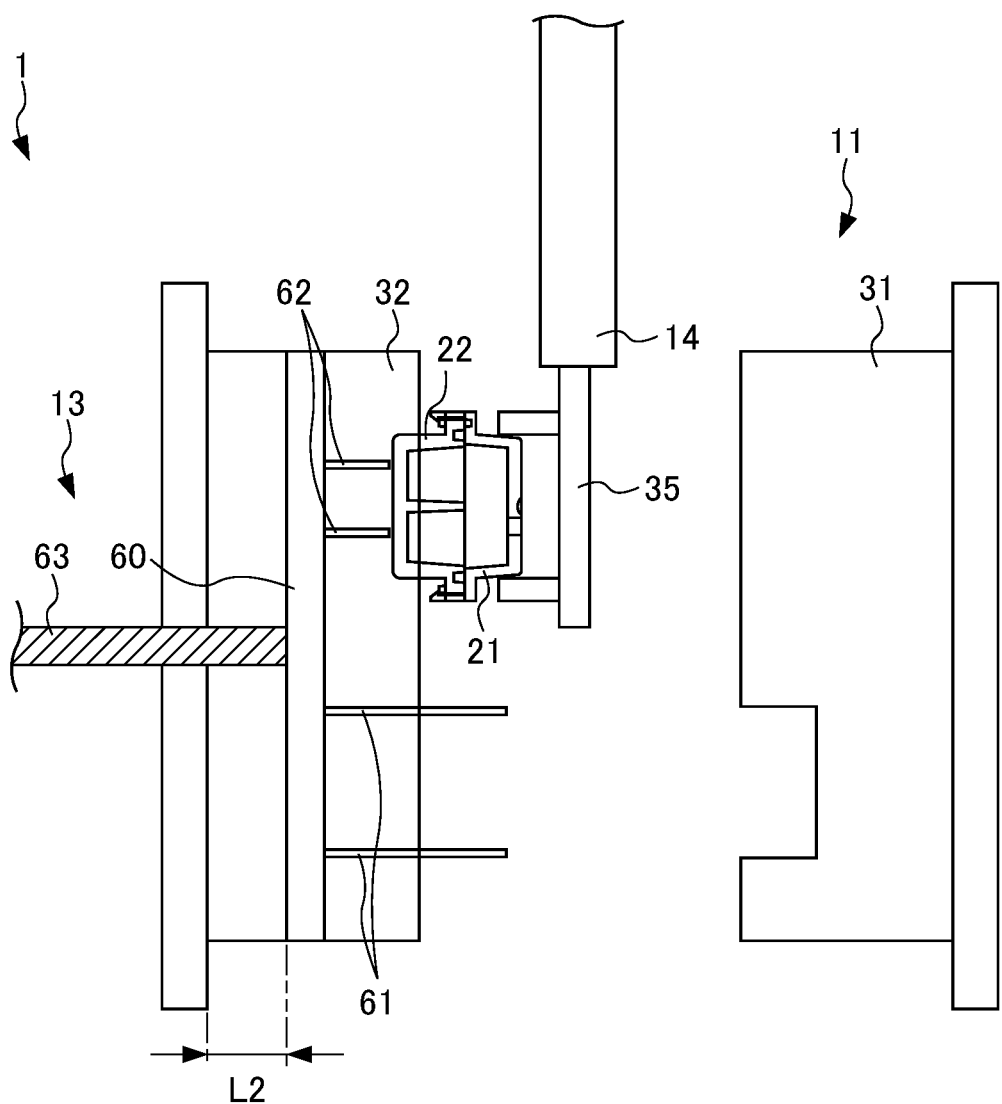
FIG. 5 is a diagram schematically illustrating an aspect in which a second molded article 22 is assembled to the first molded article 21 by way of a second extruding member.

FIG. 5 is a diagram schematically illustrating an aspect in which the second molded article 22 is assembled to the first molded article 21 by way of the second extruding member. As illustrated in FIG. 5, the controller 100 controls the servomotor 53 of the robot 14 such that the first molded article 21 is retained at the assembling position. In addition, the controller 100 controls the servomotor 52 so as to press the second molded article 22 against the first molded article 21 retained at the assembling position. Since the base 60 moves by a distance L2 that is longer than the distance L1, the second extruding member 62 lifts the second molded article 22 to the second extruding position.

Since the second extruding position is the assembling position, the second molded article 22 having moved to the assembling position is pressed against the first molded article 21, and reaches a fitted state. When fitting the first molded article 21 and the second molded article 22, for example, a snap-fit fitting structure can be used as well. Through the above-described processing, an assembled article is manufactured, in which the second molded article 22 is assembled to the first molded article 21.

The controller 100 of the present embodiment performs defect discrimination of an assembled state of the first molded article 21 and the second molded article 22. As illustrated in FIG. 2, the controller 100 of the present embodiment includes a load detection unit 110, a defect discrimination unit 120, and a storage unit 130, which are the configuration for performing defect discrimination of an assembled state.

The load detection unit 110 detects a reaction force at the time of assembling the second molded article 22 to the first molded article 21 as a load. In the present embodiment, a current value of the servomotor 52 is monitored as an index indicating the load torque. Note that, as described later, the load torque detected by way of the load detection unit 110 is not limited to the current value of the servomotor 52 of the ejector 13; and another parameter can also be used as an index indicating a reaction force.

The defect discrimination unit 120 discriminates a defective or non-defective assembled state of the first molded article 21 and the second molded article 22, based on the current value detected by way of the load detection unit 110. At the time of assembling, if a molding defect is generated, or the position of the first molded article 21 is deviated from an appropriate position, or the position of the second molded article 22 is deviated from an appropriate position, the reaction force applied to the second extruding member 62 of the ejector 13 will be deviated from a normal range. In the present embodiment, load torque (current value) of the servomotor 52 is utilized as an index indicating a reaction force applied to the second extruding member 62, and is compared with the reaction force applied to the servomotor 52 in a normal state, thereby discriminating a defective or non-defective assembled state. In the case of a molded article having a fitting structure, difference in a reaction force (load) generated at the time of assembling can be easily discriminated between a normal state and an abnormal state.

The storage unit 130 stores a variety of information such as programs and data for performing defect discrimination. In the present embodiment, the storage unit 130 stores allowable values which have been set up based on the current values when the first molded article 21 and the second molded article 22 were non-defective articles and an assembling operation was appropriately performed. The storage unit 130 stores the allowable values as a predetermined range of values, which serve as a standard for performing defect discrimination.

The injection molding system 1 of the present embodiment includes an alarm 150 as a notification unit that notifies an operator of the fact that a defective article was discriminated by the defect discrimination unit 120. The operation of the alarm 150 is controlled by the controller 100; and when a defective article is discriminated by the defect discrimination unit 120, the alarm 150 is activated to provide an alarm tone or warning light.

Figure 6:
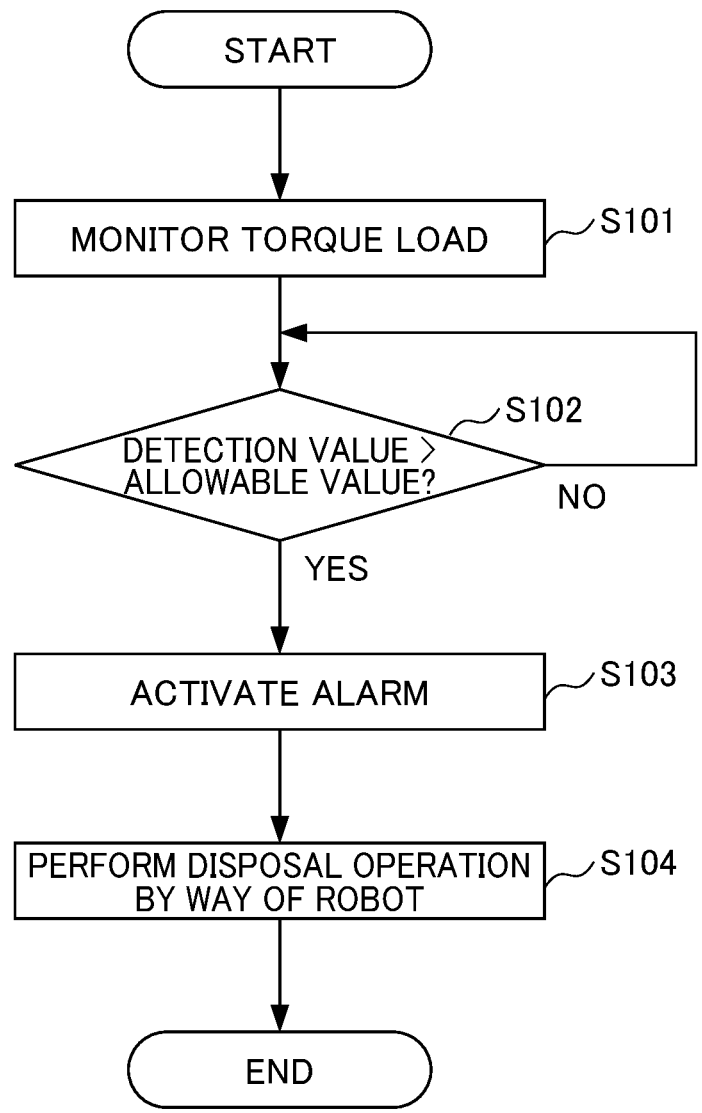
FIG. 6 is a flowchart illustrating a flow of defect discrimination performed by a controller 100.

FIG. 6 is a flowchart illustrating a flow of defect discrimination performed by the controller 100 of the present embodiment. As illustrated in FIG. 6, when a defect discrimination mode begins, the controller 100 monitors the load torque (Step S101). In the present embodiment, a current value is monitored as the load torque.

When a detection value of the load detection unit 110 exceeds an allowable value, the defect discrimination unit 120 discriminates the assembled article as defective (Step S102). As described above, allowable values are set up as a predetermined range of values, and when deviation in the detection value exceeds the preset range of allowable values, such an event is determined as defective assembling or defective molding. If the detection value does not exceed the allowable value in the processing in Step S102, the monitoring will be continued. In this manner, in the assembling operations, a detection value is sequentially compared with load torque as a parameter indicating a reaction force.

In the processing in Step S102, if a detection value exceeds the allowable value, and the assembling or molding is discriminated as defective, the alarm 150 is activated, and the operator is notified of the fact that a defective article was produced (Step S103). Next, the assembled article, in which the second molded article 22 is assembled to the first molded article 21, is taken out of the mold 11, transferred to a predetermined disposal place, and disposed of, by way of the robot 14 (Step S104). Step S104 may be configured such that the first molded article 21 or the second molded article 22 is separately transferred to the disposal place.

The injection molding system 1 of the embodiment described above achieves effects as follows.

Namely, the injection molding system 1 according to the present embodiment includes: the mold 11 in which the first molded article 21 and the second molded article 22 can be simultaneously molded; the first extruding member 61 that extrudes the first molded article 21 from the mold 11; the robot 14 that transfers the first molded article 21 extruded from the mold 11 to the assembling position where the first molded article 21 is assembled to the second molded article 22 in the mold 11; the second extruding member 62 that extrudes the second molded article 22 from the mold 11 towards the first molded article 21 retained at the assembling position by way of the robot 14, and assembles the second molded article 22 to the first molded article 21; and the load detection unit 110 that detects load applied to the second extruding member 62, in which defect discrimination is performed based on the load detected by the load detection unit 110 when the second molded article 22 is assembled to the first molded article 21.

Thus, an assembling operation for the first molded article 21 and the second molded article 22 can serve as an inspection (evaluation) of a fitted state (assembled state) and the strength. The first molded article 21, the second molded article 22, or the assembled state of the first molded article 21 and the second molded article 22 is distinguished as defective or non-defective, based on the load at the time of assembling; therefore, any defect in the assembled article of the first molded article 21 and the second molded article can be immediately detected, a defective article can be prevented from being conveyed straight to the downstream process, and the productivity can be improved.

Further, the injection molding system 1 of the present embodiment includes the first extruding member 61 and the base 60 that supports the second extruding member 62 being formed shorter than the first extruding member 61; and the first extruding member 61 and the second extruding member 62 move integrally with the base 60. Through a first extruding operation, the first molded article 21 moves to the first extruding position where the first molded article 21 is extruded from the mold 11 by way of the first extruding member 61; and through a second extruding operation, the base 60 progressively moves from the first extruding position to the assembling position where the second molded article 22 is extruded from the mold 11 by way of the second extruding member 62.

Thus, the servo motor 52 can also serve as the drive unit for driving the first extruding member 61 and the second extruding member 62. Therefore, the device configuration and the ejector control can be simply integrated.

Further, the load detection unit 110 of the present embodiment detects a current value as load torque of the servo motor 52 for driving the second extruding member 62.

Moreover, the robot 14 being the molded-article transfer device of the present embodiment is an articulated robot.

Thus, complicated shapes are allowed for the mold 11 and the cavities of the mold 11, and a flexible and highly accurate transfer operation of a molded article is enabled.

In addition, the injection molding system 1 of the present embodiment includes the alarm 150 that is activated when abnormality is discriminated in the performance of defect discrimination.

Thus, the alarm 150 can immediately notify the operator of abnormal occurrence, allowing for promptly detecting abnormality of the mold 11.

Further, when abnormality is discriminated in the performance of defect discrimination, the robot 14 of the present embodiment transfers the first molded article 21, the second molded article 22, or an assembled article in which the first molded article 21 is assembled to the second molded article 22, to the disposal position outside of the mold 11.

Thus, an assembled article discriminated as defective in the performance of defect discrimination is automatically rejected as a defective article to the disposal place, thereby saving the trouble of taking out the defective article from the mold 11, and improving the efficiency of the operations needed when a defective article is produced.

In the above-described embodiment, a current value of the servo motor 52 for driving the first extruding member 61 and the second extruding member 62 is used as load to be detected by the load detection unit 110; however, a detection value used for the defect discrimination can be changed depending on the circumstances as appropriate. A description is now made on an example, in which load to be detected by the load detection unit 110 is different from that in the above-described embodiment. Note that, in the following description, features similar to those in the above-described embodiment may be assigned with the same reference numbers, and a description thereof may be omitted.

Figure 7:
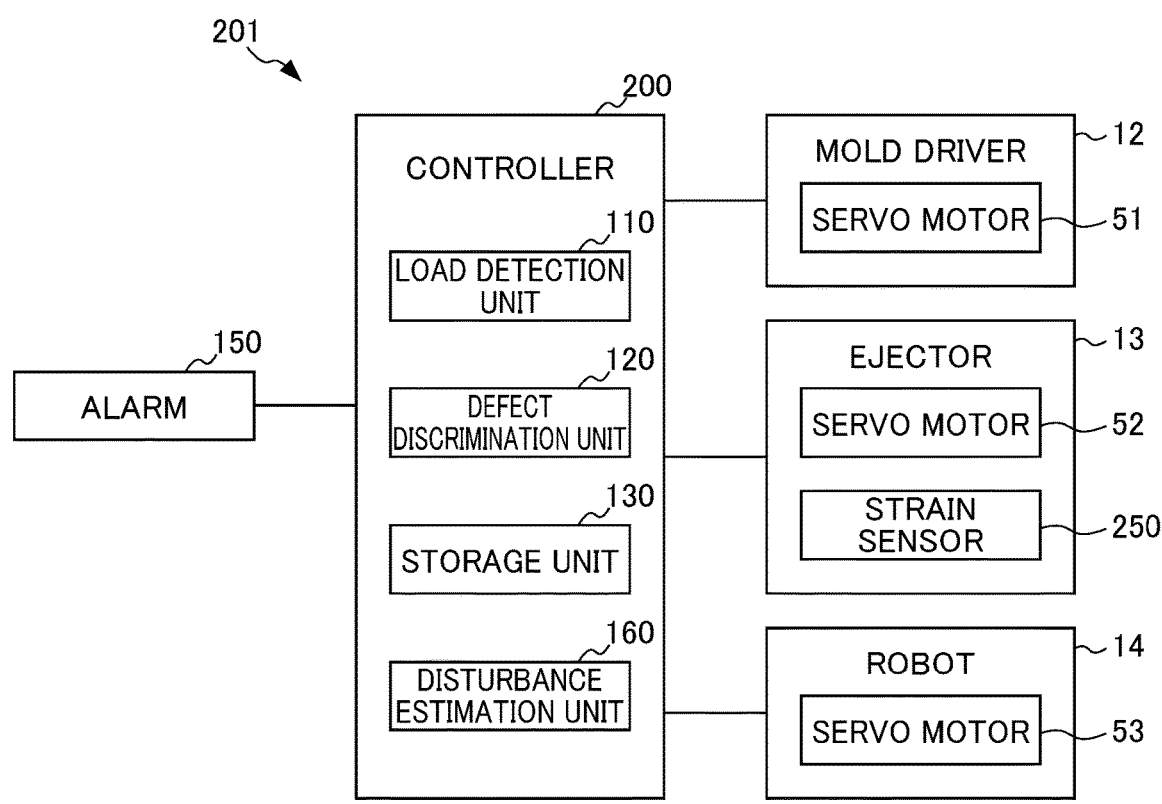
FIG. 7 is a block diagram of an injection molding system 201 according to an alternative embodiment.

FIG. 7 is a block diagram of an injection molding system 201 according to an alternative embodiment. As illustrated in FIG. 7, the injection molding system 201 of the alternative embodiment includes a strain sensor 250 arranged to an axis-like portion of the second extruding member 62. The strain sensor 250 is a mechanical sensor for measuring strain of the second extruding member 62. Load applied to the second extruding member 62 is detected, based on a detection value of the strain sensor 250.

The load detection unit 110 of the alternative embodiment performs defect discrimination, based on an allowable value that is set up based on detection values of the strain sensor 250 in the normal state, and a detection value of the strain sensor 250 detected during the assembling. Note that a flow of the defect discrimination is similar to that in the above-described embodiment.

Further, a controller 200 provided to the injection molding system 201 of the alternative embodiment includes a disturbance estimation unit 160 for estimating disturbance of the servo motor 52. The disturbance estimation unit 160 of the present embodiment calculates an estimated disturbance value by using at least one of rotational speed and torque of the servo motor 52. For example, an estimated disturbance value is calculated, based on an instruction value and a feedback value (actual value) of the servo motor 52.

Further, the load detection unit 110 can also detect such an estimated disturbance value as load applied to the second extruding member 62, and perform defect discrimination based on such an estimated disturbance value. Namely, an allowable value is set up based on an estimated disturbance value calculated when an assembling operation was normally performed; and defect discrimination is performed by comparing the allowable value with an estimated disturbance value calculated by way of the disturbance estimation unit 160 at the time of assembling. Since the estimated disturbance value is calculated based on rotational speed or torque, this method can also detect abnormal assembling.

Further, the load detection unit 110 can detect a current value indicating load torque of the servo motor 53 of the robot 14 as load, and can perform defect discrimination based on such a current value. Namely, defect discrimination of an assembled article can also be performed based on the load (reaction force) applied to the robot 14 when the first molded article 21 and the second molded article 22 are assembled.

Further, the load torque of the servo motor 52 of the ejector 13 or the load torque of the servo motor 53 of the robot 14 is not limited to the way of calculation based on a current value. For example, a torque detection device for directly detecting load torque of the servo motor 52 may be provided; and load torque detected by way of the torque detection device may be monitored.

Furthermore, the load detection unit 110 can perform defect discrimination by combining a plurality of types of load, in relation to the load detection unit 110 as illustrated above. Namely, the injection molding system 201 detects at least one of the following for defect discrimination: a current value of the servo motor 52, an estimated disturbance value which is disturbance estimated of the servo motor 52, a detection value of the strain sensor 250 provided to the second extruding member 62, load torque of the servo motor 53 for driving the robot 14, and a current value of the robot 14.

Thus, defect discrimination can be accurately performed by detecting the load applied to at least one of the second extruding member 62 and the robot 14. Accuracy of the defect discrimination can be further improved by combining a plurality of parameters.

Preferred embodiments of the present invention have been described above; however, the present invention is not limited to the above-described embodiments, but can be modified as appropriate.

In the above-described embodiments, an articulated robot is used for the robot 14 serving as the molded-article transfer device; however, the configuration of the molded-article transfer device can be changed as appropriate, without limitation to this configuration. For example, the robot can be replaced with a Cartesian coordinate robot which is also referred to as a takeout machine.

In the above-described embodiment, the alarm 150 provides a warning; however, the present invention is not limited to such a configuration. The method for notifying an operator can be changed depending on the circumstances as appropriate, to sound production, voice, light emission, image display, etc. Further, the alarm 150 and the control for operating the alarm 150 can be omitted.

The above-described embodiments are configured such that the assembled article discriminated as defective in the performance of defect discrimination is transferred to the disposal place by way of the robot 14; however, this process may be omitted, and a defective article may be manually rejected.

The above-described embodiments are configured such that the first extruding member 61 and the second extruding member 62 are supported by way of the base 60 and driven by the servo motor 52 shared; however, the present invention is not limited to such a configuration. For example, separate configurations may independently extrude the first molded article 21 and the second molded article 22, respectively. Further, the configurations of the above-described embodiments and the alternative embodiment may be changed as appropriate, from the perspective of avoiding complexity of the mold structure or dropping a molded article.

EXPLANATION OF REFERENCE NUMERALS

1: injection molding system
11: mold
14: robot (molded-article transfer device)
21: first molded article
22: second molded article
52: servo motors (motor for extruding member)
53: servo motors (motor for transfer device)
61: first extruding member
62: second extruding member
110: load detection unit
150: alarm (warning device)
201: injection molding system
250: strain sensor

What is claimed is:

1. An injection molding system, comprising:
a mold in which a first molded article and a second molded article can be simultaneously molded;
a first extruding member that extrudes the first molded article from a cavity of the mold;
a molded-article transfer device that includes a retention mechanism for retaining the first molded article extruded from the cavity of the mold, and transfers the first molded article retained by way of the retention mechanism to an assembling position in relation to the second molded article in the mold;
a second extruding member that extrudes the second molded article from the cavity of the mold against the first molded article retained at the assembling position in the mold by way of the retention mechanism of the molded-article transfer device, and assembles the second molded article to the first molded article; and
a load detection unit that detects load applied to both the second extruding member and the molded-article transfer device, wherein
defect discrimination of a state of fitting the first molded article, the second molded article, or an assembled state of the first molded article and the second molded article is performed, based on load detected by way of the load detection unit when the second molded article is assembled to the first molded article, in the mold.

2. The injection molding system according to claim 1, wherein the load detection unit detects at least one of: load torque of a motor for an extruding member that drives the second extruding member; a current value of the motor for the extruding member; an estimated disturbance value that is disturbance estimated of the motor for the extruding member; a detection value of a strain sensor provided to the second extruding member; load torque of a motor for a transfer device that drives the molded-article transfer device; and a current value of the motor for the transfer device.

3. The injection molding system according to claim 1, wherein the molded-article transfer device is an articulated robot.

4. The injection molding system according to claim 1, further comprising a warning device that is activated when abnormality is discriminated in the performance of defect discrimination.

5. The injection molding system according to claim 1, wherein when abnormality is discriminated in the performance of defect discrimination, the molded-article transfer device transfers the first molded article, the second molded article, or an assembled article in which the first molded article is assembled to the second molded article, to a disposal position outside of the mold.

6. An injection molding system, comprising:
a mold in which a first molded article and a second molded article can be simultaneously molded;
a first extruding member that extrudes the first molded article from a cavity of the mold;
a molded-article transfer device that includes a retention mechanism for retaining the first molded article extruded from the cavity of the mold, and transfers the first molded article retained by way of the retention mechanism to an assembling position in relation to the second molded article in the mold;
a second extruding member that extrudes the second molded article from the cavity of the mold against the first molded article retained at the assembling position in the mold by way of the retention mechanism of the molded-article transfer device, and assembles the second molded article to the first molded article; and
a load detection unit that detects load applied to at least one of the second extruding member and the molded-article transfer device,
wherein defect discrimination of a state of fitting the first molded article, the second molded article, or an assembled state of the first molded article and the second molded article is performed, based on load detected by way of the load detection unit when the second molded article is assembled to the first molded article, in the mold, wherein the first extruding member is formed longer than the second extruding member, allowing for the ejecting of the first molded article prior to ejecting the second molded article.

* * * * *